United States Patent
Godinez et al.

(10) Patent No.: US 10,917,493 B2
(45) Date of Patent: Feb. 9, 2021

(54) DYNAMIC EDGE CACHE CONTENT MANAGEMENT

(71) Applicant: BBY SOLUTIONS, INC., Richfield, MN (US)

(72) Inventors: Sean Godinez, Woodbury, MN (US); David Adolphson, Apple Valley, MN (US); Mike Boldischar, Lino Lakes, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 152 days.

(21) Appl. No.: 16/165,161

(22) Filed: Oct. 19, 2018

(65) Prior Publication Data
US 2020/0128095 A1 Apr. 23, 2020

(51) Int. Cl.
*H04L 29/08* (2006.01)
*H04L 29/06* (2006.01)

(52) U.S. Cl.
CPC ...... *H04L 67/2842* (2013.01); *H04L 65/1063* (2013.01); *H04L 67/02* (2013.01)

(58) Field of Classification Search
CPC ......... H04L 67/02; H04L 67/10; H04L 67/20; H04L 67/2842; H04L 63/0428; H04L 63/08; H04L 63/10; H04L 9/3236; H04L 9/3247; H04L 9/0643; H04L 9/14; H04W 12/0609; H04W 12/0401; H04W 12/0602; G06F 21/10; G06F 21/105; G06F 21/31; G06F 21/51; G06F 21/556; G06F 21/566; G06F 21/604; G06F 21/606; G06F 21/6245; H04N 21/4627; H04N 21/25816; H04N 21/44204; H04N 21/6334; H04N 21/2396;
(Continued)

(56) References Cited

U.S. PATENT DOCUMENTS 6,192,382 B1 * 2/2001 Lafer .................... G06F 16/986
                                                    715/205
6,553,413 B1    4/2003 Lewin et al.
(Continued)

OTHER PUBLICATIONS

"Edge caching", [online]. Retrieved from the Internet: <URL: https://www.ibm.com/support/knowledgecenter/en/SSZLC2_8.0.0/com.ibm.commerce.admin.doc/concepts/cdc_esi.htm>, (May 10, 2018), 9 pgs.

(Continued)

*Primary Examiner* — Douglas B Blair
*Assistant Examiner* — Rachel J Hackenberg
(74) *Attorney, Agent, or Firm* — Schwegman Lundberg & Woessner, P.A.

(57) ABSTRACT

Systems and techniques for dynamic edge cache content management are described herein. A request for a webpage may be received from a content delivery network that includes at least one content item identifier. One or more content delivery network directives may be constructed for the webpage. The one or more content delivery network directives may be transmitted to the content delivery network. The one or more content delivery network directives include a key with a hash variable reference. A request may be received from the content delivery network for a hash value corresponding to the hash variable reference. The request may include the key. A hash value may be computed for the content item. The key including the hash value may be transmitted to the content delivery network.

21 Claims, 5 Drawing Sheets

(58) Field of Classification Search
CPC ........... H04N 21/2541; H04N 21/4408; H04N 21/4622; H04N 21/64784; H04N 21/6125; H04N 1/00464
See application file for complete search history.

(56) References Cited

U.S. PATENT DOCUMENTS

| | | | | |
|---|---|---|---|---|
| 6,823,391 | B1* | 11/2004 | Deen | H04L 61/301 709/229 |
| 7,133,905 | B2* | 11/2006 | Dilley | H04L 29/06 709/219 |
| 7,240,100 | B1* | 7/2007 | Wein | H04L 63/08 709/214 |
| 7,752,258 | B2* | 7/2010 | Lewin | G06F 16/9574 709/203 |
| 9,088,634 | B1 | 7/2015 | Corley et al. | |
| 9,680,952 | B2* | 6/2017 | Kovacs | H04L 67/2842 |
| 9,755,834 | B1* | 9/2017 | Johnson | H04L 67/18 |
| 2003/0097564 | A1* | 5/2003 | Tewari | H04L 29/12113 713/171 |
| 2004/0015538 | A1 | 1/2004 | Agarwalla et al. | |
| 2007/0050491 | A1* | 3/2007 | Kataoka | H04L 67/288 709/223 |
| 2009/0150518 | A1 | 6/2009 | Lewin et al. | |
| 2012/0124372 | A1* | 5/2012 | Dilley | H04L 63/0471 713/162 |
| 2013/0144750 | A1 | 6/2013 | Brown | |
| 2014/0222900 | A1* | 8/2014 | Todd | H04L 67/2842 709/203 |
| 2018/0213053 | A1* | 7/2018 | Yeager | H04L 67/1014 |

OTHER PUBLICATIONS

Hines, B., "IBM WebSphere Developer Technical Journal: Static and dynamic caching in WebSphere Application Server V5", [online]. [archived on Nov. 28, 2016]. Retrieved from the Internet: <URL: https://web.archive.org/web/20161128205627/https://www.ibm.com/developerworks/websphere/techjournal/0405_hines/0405_hines.html>, (May 12, 2004), 19 pgs.

* cited by examiner

DYNAMIC EDGE CACHE CONTENT MANAGEMENT

TECHNICAL FIELD

Embodiments described herein generally relate to webpage content cache management and, in some embodiments, more specifically to dynamic edge cache breaking.

BACKGROUND

Webpage content may be provided by a webserver. Webpage visitors may access the web content from around the world. Caching webpage content on edge servers closer to the visitors may increase the speed of rendering webpages and may reduce the processing cost of serving webpages by reducing the load on the webserver and reducing the distance the number of routers that the content traverses. However, cached content may become stale which may result in the visitor receiving outdated content. This leads to a significant tradeoff for websites which wish to provide content that is frequently changing or personalized.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Edge caching of web page content items (e.g., serving copies of content from a distributed content delivery network that hosts data centers closer to the user, etc.) may result in faster web content delivery to the user and reduced bandwidth utilization across the internet backbone. The reduction in long distance traffic may also reduce costs for content providers. However, because edge caching relies on replicated copies of files, data may become stale and may not be quickly refreshed in the cache. This may result in unnecessary storage utilization as well as the delivery of stale content to users.

Traditional solutions for addressing stale content in the edge cache (e.g., an content cache of a content delivery network, etc.) may use periodic polling to determine when a file has changed and should be replicated to the edge cache(s). However, periodic polling may result in unnecessary resource utilization on the content servers (e.g., application server, etc.) when the content items on the content servers are compared to the content items in the edge cache and found to be current. The systems and techniques discussed herein increase efficiency and reduce utilization of the content servers by providing content directives for content items with hash variable references in edge cache keys. The hash value and a time to live value are used to determine if the content stored in the edge cache is current or if the content should be revalidated and issued a new hash value or if current content should be retrieved from the content server. The time to live value is set to approximate the expiration timestamp for its respective content item. Thus, requests received after expiration of the content item may trigger revalidation or retrieval of current content from the content server.

Some content items may be personalized for users that have sent a request for a page (e.g., based on cookie data, location-based services, etc.). Each of these personalized content items may be stored in the edge cache with a unique cache key for each variation of the content. However, by using the hash value as a portion of the key, each of the variations may effectively be cross-linked to the underlying content item that was personalized. This means that when the underlying content item expires, access to any of the variations may trigger revalidation of the content item or retrieval of the current content item. A personalized variation of the new content item may then be generated and presented to the web browser of the user.

In an example, before Monday, a new web page is created and published such that it "goes live" at 12 AM Monday. and "ends" or "changes" at 12 AM Tuesday. A hash for this content is pre-computed. At 12 AM on Monday, the page goes live, begins receiving traffic, and content is cached efficiently at the edge cache of the content delivery network with a 24-hour time-to-live. The hash value is retrieved often and is not changing because content is not changing. At 9 AM Monday, the content is updated and different content is published to this same page that will be effective at O1 AM Monday and end at 12 AM Tuesday. At 10 AM Monday (approximately), the new content "goes live". The hash value is different and as soon as this new hash value is sent to the content delivery network, the new content is served from the application and cached at the content delivery network. At 11 AM Monday, the content is updated again and the original content is published again that will be effective at 12 PM Monday and end at 12 AM Tuesday. At 12 PM Monday (approximately), the "original" "content" goes live "again." The hash value reverts to the original hash value, and the content delivery network finds this original content is still in cache. Thus, only the new (original) hash needs to be served to the content delivery network, the original content was not required to be "served again" because it was still in CDN cache from its use from 12 AM to 10 AM and it was never purged.

Figure 1:
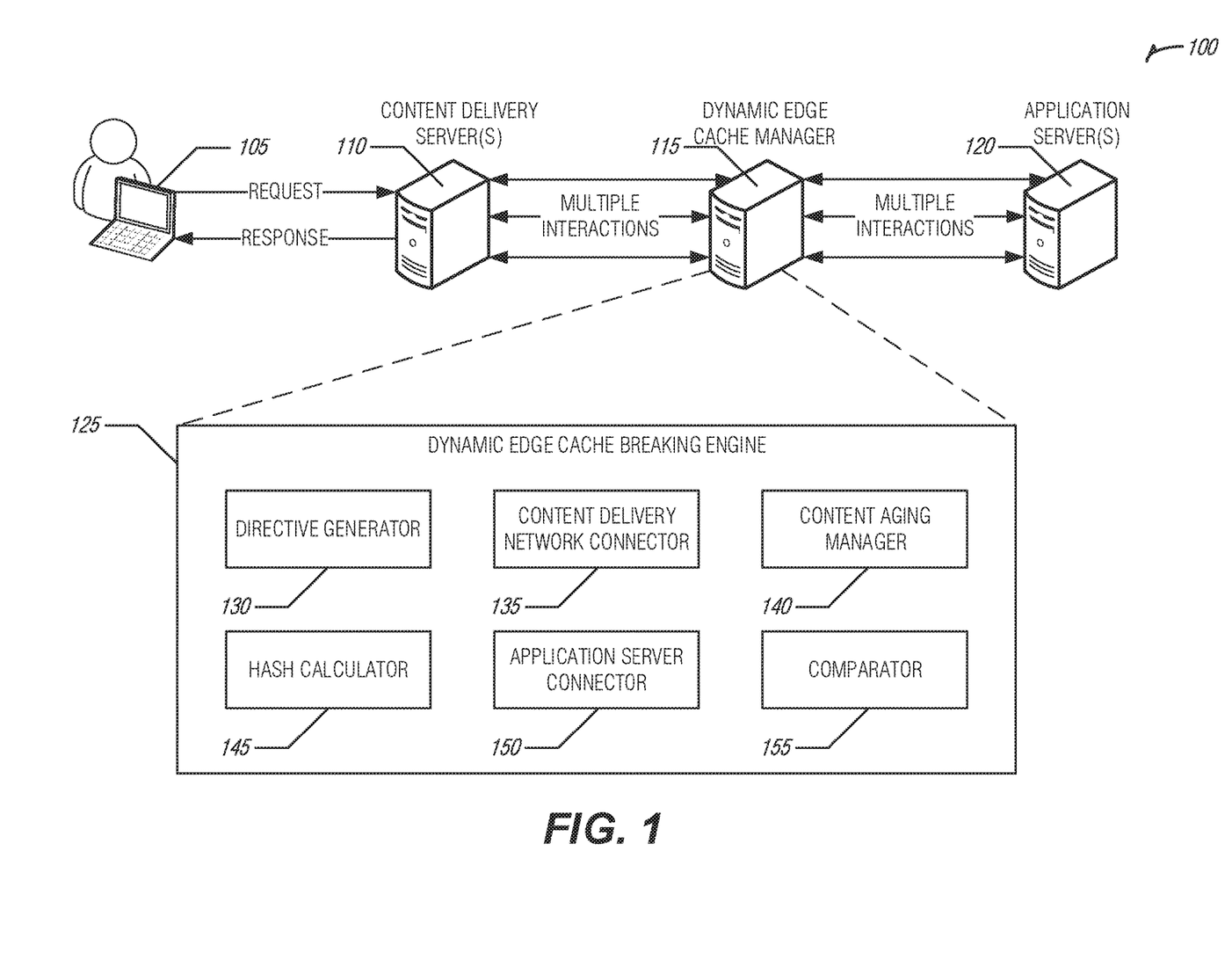
FIG. 1 is a block diagram of an example of an environment and a system for dynamic edge cache content management, according to an embodiment.

FIG. 1 is a block diagram of an example of an environment 100 and a system 125 for dynamic edge cache content management, according to an embodiment. The environment may include a user computing device 105 (e.g., desktop computer, laptop computer, tablet, smartphone, etc.), content delivery server(s) 110 (server computing device, cloud computing system, virtual computing system, etc.), dynamic edge cache manager 115 (server computing device, cloud computing system, virtual computing system, etc.), and application server(s) 120 (server computing device, cloud computing system, virtual computing system etc.).

The application server(s) 120 may be distant from the user computing device 105. To increase the efficiency of delivering web content to the user computing device 105, the application server(s) 120 may provide content fragments for various webpages to the content delivery server(s) 110. The content delivery server(s) 110 may store the content fragments in an edge cache (e.g., storage locations closer to the user computing device 105, etc.). The content delivery server(s) 110 may be part of a content delivery network that delivers web content to user that are geographically dispersed from the application server(s) 120. The content delivery network allows content to be delivered more efficiently by delivering content from edge caches located closer to users. Content fragments stored in the edge cache may be periodically updated at the application server(s) 120. If the content fragments are not updated in a timely manner in the edge cache, stale content (e.g., outdated content fragments, etc.) may be presented to the user computing device 105.

Traditional edge cache update methods such as polling for updates may be less efficient because of the excess network traffic and processing generated by polling calls when no new content is available. In addition, stale content may be retrieved between the time new content is made available on the application server(s) 120 and when the next polling call is initiated. The techniques discussed herein solve the issues with traditional edge cache updates by generating a hash value for each content fragment along with a time-to-live value. The content delivery server(s) 110 work in conjunction with the dynamic edge cache manager 115 to identify whether a content fragment for a requested webpage remains valid (e.g., is the hash value valid for the request period, etc.). If not, a new content fragment with a new hash value and time-to-live will be generated for the content fragment or for the updated content fragment retrieved from the application server(s) 120.

A user of the user computing device 105 may request a webpage. The webpage may consist of several content fragments. Content fragments may include, text, images, code blocks, links, attributes, etc. For example, a user may use a web browser to access a webpage that includes content fragments for product images, links, and text that may be rendered into a webpage delivered to the web browser executing on the user computing device 105. Content fragments may be provided by the application server(s) 120 to the content delivery server(s) 110. When a request for a content fragment is received by the content delivery server(s) 110, the content delivery server(s) 110 may serve the content fragment from an edge cache if it is found. Otherwise, the content fragment may be returned from the application server(s) 120.

For example, html code blocks may be included in html code of the webpage that contains information used to load an image included in the webpage. The content delivery server(s) 110 may use the information to locate the image in the edge cache. For example, a reference to the hash value in the html code may be used to determine the hash value which may be used in turn to determine if the content is available in the edge cache. If the image is not found in the edge cache, the content delivery server(s) 110 may obtain the image from the application server(s) 120 for rendering the webpage for the user. The image may then be persisted in the edge cache. Content items such as, for example, references to cascading style sheets (CSS), references to JavaScript. "inline" CSS. JavaScript, other HTML, and Edge-Side-Include directives may be edge cached.

The dynamic edge cache manager 115 may manage caching of content from the application server(s) 120 to the edge cache for the content delivery server(s) 110. The dynamic edge cache manager 115 generates a hash value for the content fragments and uses the hash values to construct directives that are used by the content delivery server(s) 110 to retrieve content for rendering the webpage for the user. The dynamic edge cache manager 115 may assign time-to-live values for the content fragments that approximate an expiration timestamp of the content fragment. For example, an expiration timestamp may be 14:00 hours and a directive constructed at 13:50 hours may have a time-to-live value of ten minutes. Upon expiration of the time-to-live value, the hash value for the content fragment may be updated and a new key may be provided to the content delivery server(s) 110. The content delivery server(s) 110 may then store an updated content item with the new key. If the content item has not changed, the content item and the key may be left in place by the content delivery server(s) 110. In another example, the expiration may be many hours away and the time-to-live value may be set to ten minutes and a new pre-calculated hash value may be assigned to the content at when the time-to-live elapses. This may prevent content from being retrieved from the edge cache after the content fragment has expired. The dynamic edge cache manager 115 may include the system 125. The system 125 may be a dynamic edge cache breaking engine. The system 125 may include a variety of components including a directive generator 130, a content delivery network connector 135, a content aging manager 140, a hash calculator 145, an application server connector 150, and a comparator 155.

The content delivery network connector 135 establishes a connection between the dynamic edge cache manager 115 and the content delivery server(s) 110. The application server connector 150 may establish a connection between the application server(s) 120 and the dynamic edge cache manager 115. The content delivery network connector 135 may facilitate multiple interactions between the content delivery server(s) 110 and the dynamic edge cache manager 115 in facilitating delivery of a content fragment. The application server connector 150 may facilitate multiple interactions between the application server(s) 120 and the dynamic edge cache manager in facilitating delivery of a content fragment. The dynamic edge cache manager 115 uses these connections to manage the delivery of content between the application server(s) 120 and the content delivery server(s) 110. The content delivery network connector 135 may receive a request for a web page including at least one content item (e.g., content fragment) identifier from a content delivery network (e.g., the content delivery server(s) 110).

The directive generator 130 may construct directives that may be used by the content delivery server(s) 110 in retrieving content fragments from the edge cache or the application server(s) 120. For example, the directives may be included in html code of the webpage and may include information used to retrieve content fragments from the edge cache. The directive generator 130 may operate in conjunction with the hash calculator 145. The hash calculator 145 may generate a hash value for a content fragment. The directive generator 130 may use the hash value in constructing a directive for the content fragment. In an example, the directive generator 130 may construct the directives as edge side includes. The directive generator 130 may construct one or more content delivery network directives for the web page. A content delivery network directive of the one or more content delivery network directives may be used to retrieve a content item associated with the at least one content item identifier. For example, the delivery directive may include the hash value and the content delivery server (s) 110 may return a content fragment from the edge cache if a content fragment associated with the hash value is located in the edge cache.

The content delivery network connector 135 may transmit the content delivery network directive to the content delivery network. The content delivery network directive may include a key with a hash variable reference. A request may be received from the content delivery network for a hash value corresponding to the hash variable reference. The request may include the key. The hash calculator 145 may compute the hash value for the content item. The hash values may be pre-computed by the hash value calculator 145. This may increase the speed and efficiency of creating and managing hash values because they may be generated in parallel with content processing. The pre-computed hash value may be obtained and provided to the content delivery server(s) 110 when new content is available at the application server(s)120 or when the time-to-live has expired for a content item. For example, the hash value may be computed by the hash calculator 145 when an actual content item is published and any time a content item is changed and published. The key may be transmitted to the content delivery network and may include the hash value.

A request may be transmitted to the application server(s) 120 requesting the content item using the key. In an example, the key may be the hash value combined with the content identifier for the content item. The content item may be transmitted to the content delivery network for rendering in the webpage for presentation in a web browser of the user.

The content aging manager 140 may set a time-to-live value for the content fragment. The time-to-live value may be set to approximate (or some time less than) the expiration timestamp of the content fragment. The time-to-live value may be used by the directive generator 130 in constructing directives for the content fragment. In an example, the time-to-live value may be stored or activated with the content fragment in the edge cache. In an example, a time-to-live may be generated for the hash value for the content item and the time-to-live may be transmitted to the content delivery network with the hash value. The content item may be requested from the application server(s) 120 using the key. The comparator 155 may compare data received in a request for a content item to data contained in the edge cache. For example, the comparator 155 may determine that the time-to-live for the content has elapsed. A content update may be requested for the content delivery network from the application server and the content item may be stored in the edge cache of the content delivery server(s) 110 with an updated key and transmitted for rendering in the webpage for presentation in a web browser of a user.

In an example, the one or more content delivery network directives may include a time-to-live value for the content item at the content delivery server(s) 110. The content item may be requested from the application server(s) 120 using the key. It may be determined (e.g., by the comparator 155) that the time-to-live value has elapsed. A content update may be requested for the content delivery server(s) 110 from the application server(s) 120 and the content item may be transmitted for rendering the webpage for presentation is a web browser of a user.

In another example, the content item may be requested from the application server(s) 120 using the key. It may be determined that there is not an edge cache key including the hash value in an edge cache of the content delivery server(s) 110. A content update may be requested for the content delivery server(s) 110 from the application server(s) 120. The content item may be transmitted for rendering the webpage for presentation in a web browser of a user.

Figure 2:
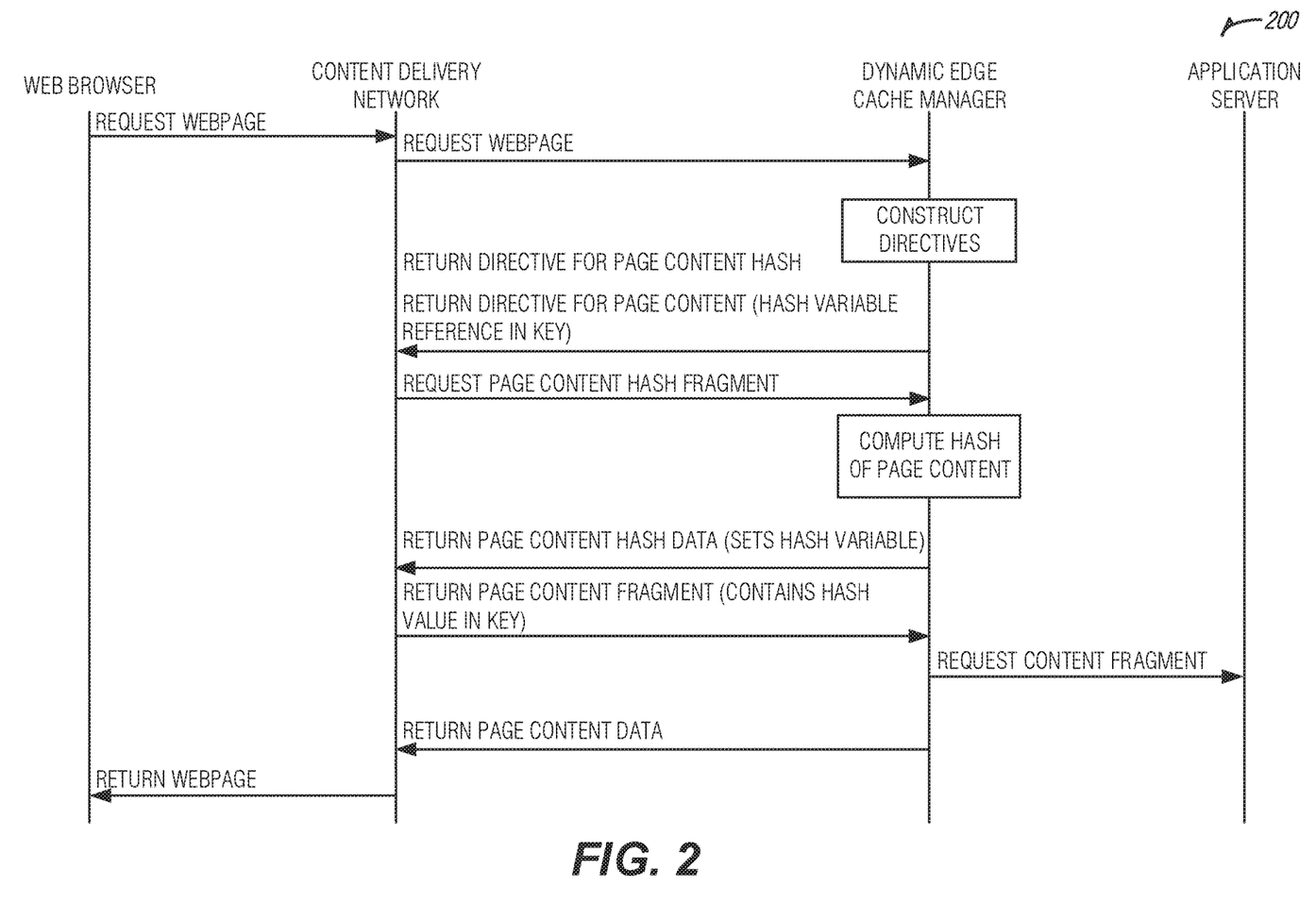
FIG. 2 is a swim lane diagram of an example of data flow for dynamic edge cache content management, according to an embodiment.

FIG. 2 is a swim lane diagram of an example of data flow 200 for dynamic edge cache content management, according to an embodiment. The data flow 200 may provide features as described in FIG. 1.

A user may request a webpage via a web browser (e.g., using user computing device 105 as described in FIG. 1). For example, the user may request an ecommerce webpage including a variety of content fragments (e.g., images, text, code blocks, videos, links, etc.). The request may be received by a content delivery network (e.g., content delivery server(s) 110 as described in FIG. 1). The content delivery network may request the webpage from the dynamic edge cache manager (e.g., dynamic edge cache manager 115 as described in FIG. 1).

The dynamic edge cache manager may construct directives for the content fragments that are included in the webpage. For example, the dynamic edge cache manager may construct a directive for each content fragment of the webpage. The dynamic edge cache manager may return a directive for a page content hash for a content fragment. The dynamic edge cache manager may return a directive for the page content including a hash variable reference in a key.

The content delivery network may request the page content hash for the content fragment. The dynamic edge cache manager may compute a hash value for the page content. In an example, the hash value may be pre-computed by the dynamic edge cache manager. The dynamic edge cache manager may obtain the hash value and transmit the page content hash data to the content delivery network to set the hash variable. In another example, the hash value may be computed on-demand when a content item is requested.

The content delivery network may return the page content fragment that contains the hash value in the key. The dynamic edge cache manager may request the content fragment from the application server (e.g., application server(s) 120 as described in FIG. 1). The dynamic edge cache manager may transmit the page content data to the content delivery network. The content delivery network may place the page content data (e.g., the content fragments) in the edge cache. The content delivery network may use the page content data to render the webpage and transmit the webpage to the web browser of the user.

Figure 3:
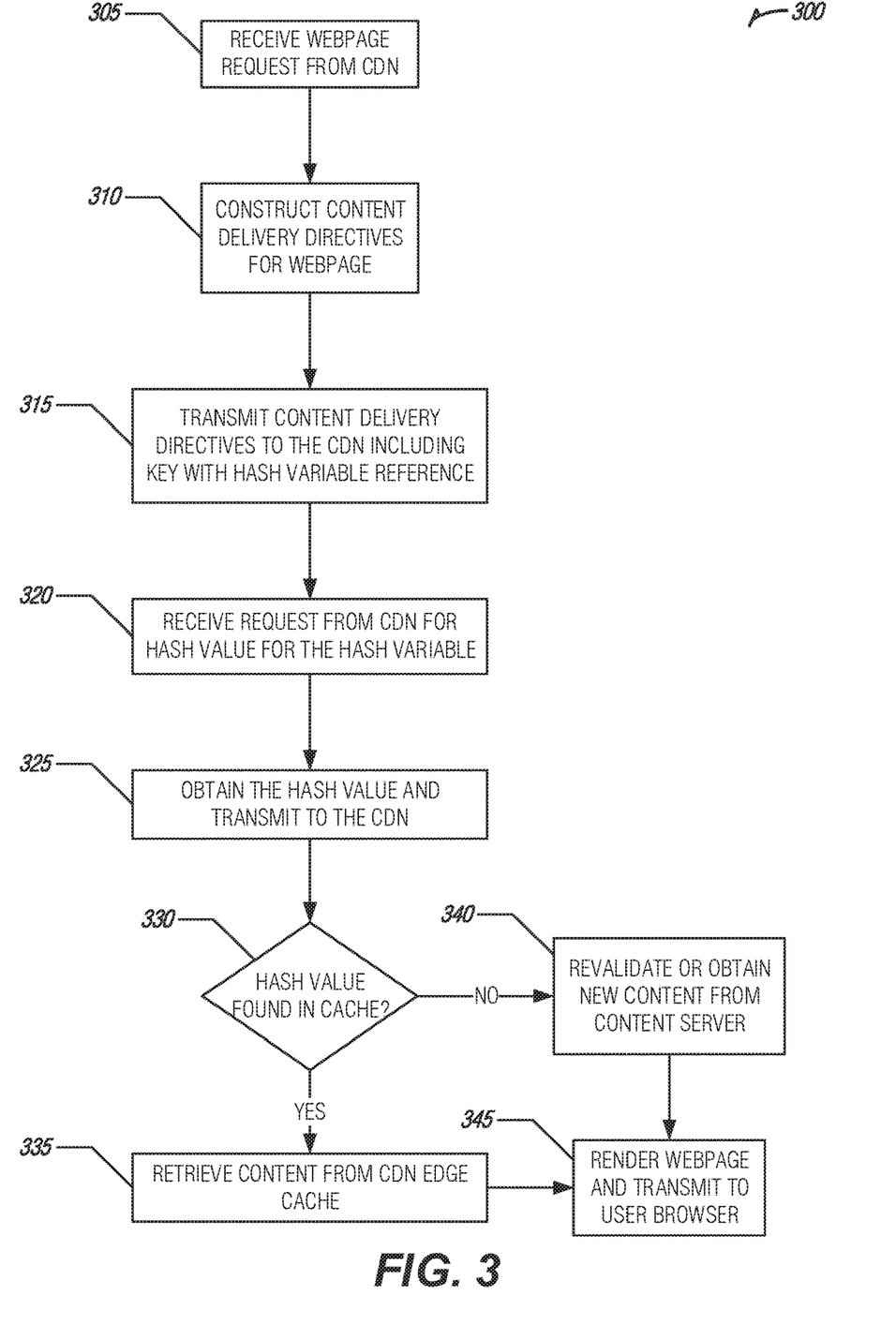
FIG. 3 is a flow diagram of a process for dynamic edge cache content management, according to an embodiment.

FIG. 3 is a flow diagram of a process 300 for dynamic edge cache content management, according to an embodiment. The process 300 may provide features as described in FIGS. 1 and 2.

At operation 305, a request for a web page may be received for a content delivery network (e.g., the content delivery server(s) 110 as described in FIG. 1). For example, a user may request a webpage via a web browser. The webpage may include a variety of content fragments that may be cached in an edge cache of the content delivery network. The content fragments may be periodically updated. To prevent stale content from being returned by the content delivery network, hash values may be generated and checked for the content fragments that may be referenced in directives provided to the content delivery network.

At operation 310, content delivery network directives may be constructed for the webpage. For example, directives may be constructed for the content fragments that are included in the webpage. The directives may include variables for a hash value for the content fragments.

At operation 315, the content delivery network directives may be transmitted to the content delivery network. The content delivery network directives may include a key with a hash variable reference. For example, the content delivery network directives may be generated within html code blocks that include variables including the hash reference variable. While the examples discuss constructing the directives as html code blocks, it will be understood that the directives may be constructed using other types of code such as, for example, Javascript, JSON, etc. The content delivery network may use the content delivery network directives to retrieve content fragments from the edge cache when rendering webpages for a user.

At operation 320, the content delivery network may request a hash value for the hash variable. When the webpage is requested, the content delivery network will attempt to retrieve each content fragment. To retrieve a content fragment using the content delivery network directives, the content delivery network will request a hash value to replace the hash reference variable.

At operation 325, a hash value may be obtained and transmitted to the content delivery network. In an example, the hash value may be pre-computed when content is published (e.g., original content published, updated content published, etc.) and upon expiration of a time-to-live value and may be retrieved by the content delivery network at operation 325. The generated hash value may be used as the value for the hash variable reference. For example, when the content delivery network references the hash variable reference included in the content delivery network directive, the variable may be set to the generated hash value. In an example, the hash value may be generated on-demand when a content item is requested.

At decision 330, it may be determined if a content fragment including the hash value is found in the edge cache. If so, the process continues at operation 335. At operation 335, the content delivery network retrieves the content from the edge cache. If a content fragment including the hash value is not found at decision 330, the process continues at operation 340. At operation 340, the content fragment corresponding to the hash value may be retrieved if a key including the hash value is located in the edge cache of the content delivery network. If not, the content item may be revalidated (e.g., the same content with a new hash value is cached, etc.) or a new content fragment and key with a new hash value may be retrieved from the application server. Thus, the hash value only changes when a new content fragment is published or when an existing content fragment is updated which reduces the network traffic by preventing updates to current content.

At operation 345, the webpage is rendered using the content fragments and is transmitted to the web browser. The user then receives a webpage including the latest content fragments available. By using the hash values and ensuring that the content fragments are retrieved (either from edge cache or from the application) with current (or fresh) hash values, the user is prevented from receiving stale content.

Figure 4:
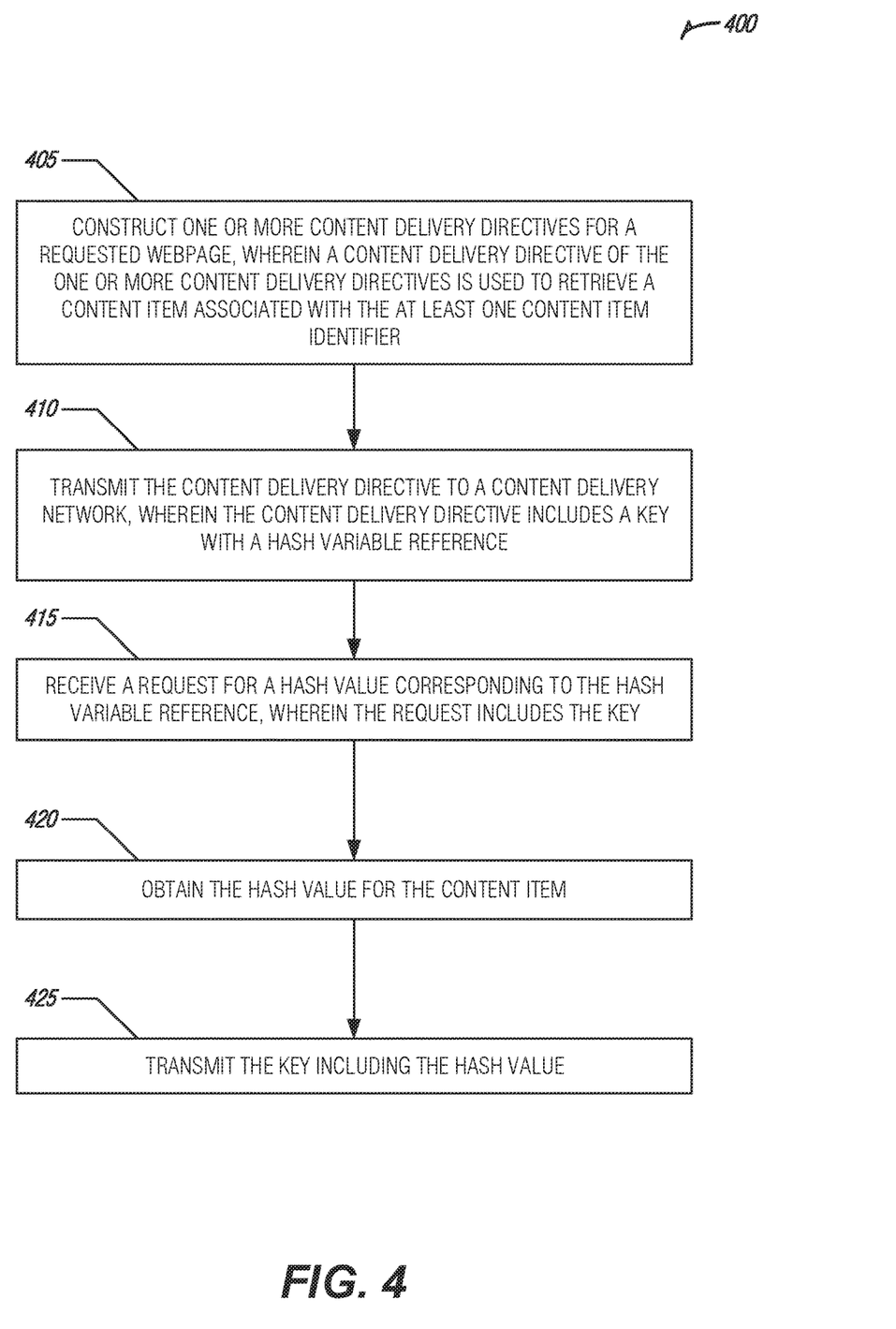
FIG. 4 is a flow diagram of an example method for dynamic edge cache content management, according to an embodiment.

FIG. 4 is a flow diagram of an example method 400 for dynamic edge cache content management, according to an embodiment. The method 400 may provide features as described in FIGS. 1-3.

One or more content delivery network directives may be constructed for a requested webpage (e.g., at operation 405). A content delivery network directive of the one or more content delivery network directives may be used to retrieve a content item associated with the at least one content item identifier. In an example, the content delivery network directives may be constructed using edge side includes. In an example the one or more content delivery network directives may include a time-to-live value. In an example, a request for the webpage may be received including at least one content item identifier. In an example, the request may be received from a content delivery network.

The one or more content delivery network directives may be transmitted to a content delivery network (e.g., at operation 410). The one or more content delivery network directives may include a key with a hash variable reference.

A request may be received for a hash value corresponding to the hash variable reference (e.g., at operation 415). In an example, the request may be received from the content delivery network. The request may be made as a result of a content delivery network directive provided to the content delivery network. The request may include the key.

A hash value may be computed for the content item (e.g., at operation 420). In an example, a time-to-live may be generated for the hash value for the content item and the time-to-live may be transmitted to the content delivery network with the hash value. In an example, the content item may be requested from an application using the key. It may be determined that the content item is not included in an edge cache of the content delivery network. A content update may be requested for the content delivery network from the application server and the content item may be transmitted for rendering the webpage for presentation in a web browser of a user.

The key including the hash value may be transmitted to the content delivery network (e.g., at operation 425). In an example, the content item may be requested from an application server using the key and the content item may be transmitted to the content delivery network for rendering the webpage for presentation in a web browser of the user. In an example, it may be determined that the time-to-live value has elapsed. An updated content item may be requested from the application server. The updated content item may be provided to the content delivery network and the content delivery server may store the updated content item in an edge cache with an updated key. The content item may be transmitted for rendering the webpage for presentation in a web browser of a user.

In another example, the content item may be requested from an application server using the key. It may be determined that there is not an edge cache key including the hash value in an edge cache of the content delivery network. A content update may be requested for the content delivery network from the application server and the content item may be transmitted for rendering the webpage for presentation in a web browser of a user.

Figure 5:
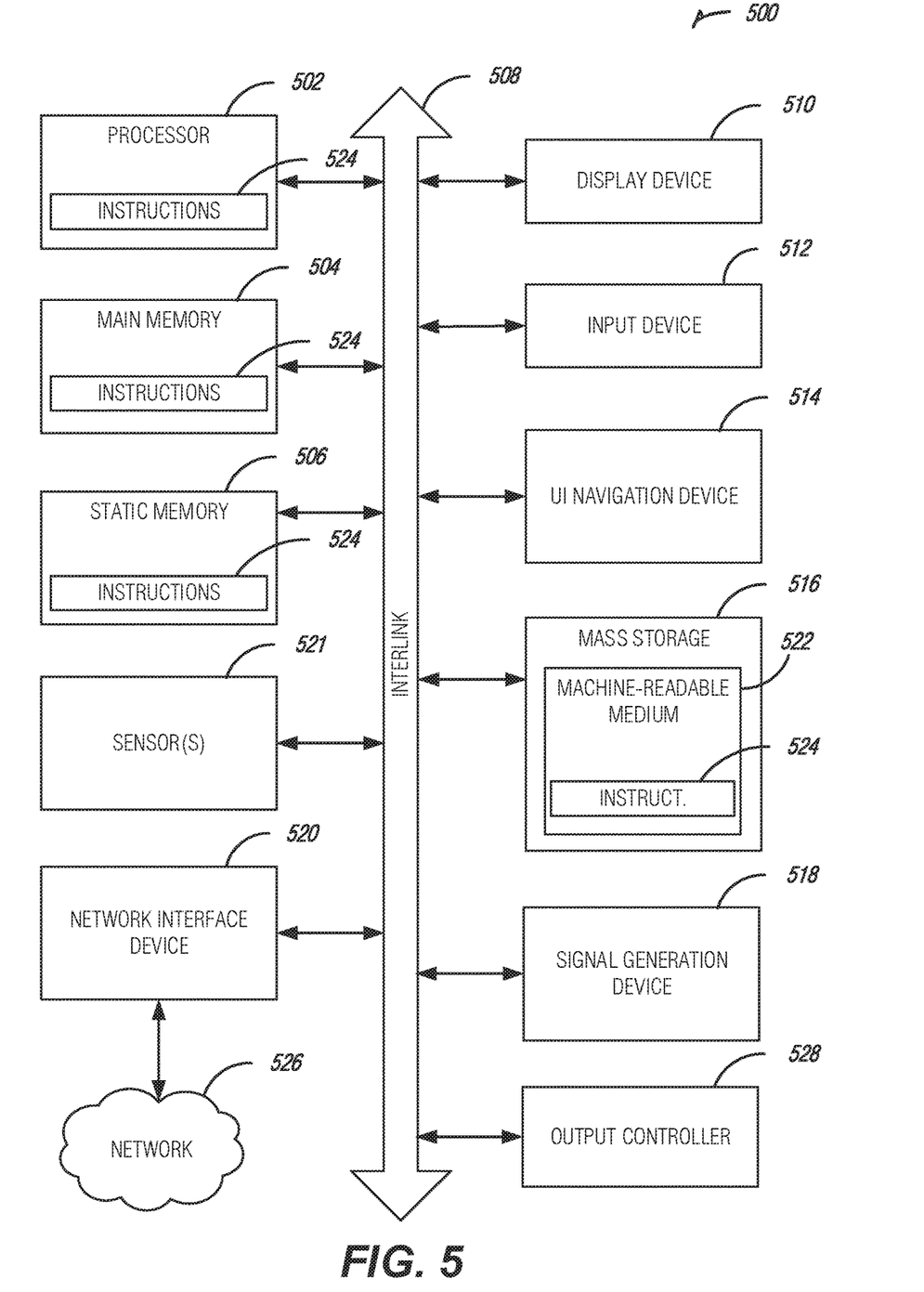
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine readable media). Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes & Examples

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for dynamic edge cache breaking, the system comprising:
   at least one processor; and
   memory including instructions that, when executed by the at least one processor, cause the at least one processor to perform operations to:
   construct one or more content delivery network directives for a requested webpage, wherein a content delivery network directive of the one or more content delivery network directives is used to retrieve a content item associated with at least one content item identifier from a content delivery network;
   transmit the one or more content delivery network directives to the content delivery network, wherein the one or more content delivery network directives respectively include a key with a hash variable reference;
   receive a request, from the content delivery network upon expiration of a content delivery network time-to-live (TTL) value for the content item, for a hash value corresponding to the hash variable reference, wherein the request includes the key;
   compute a current hash value for the content item from an application server; and
   transmit, to the content delivery network, the key including the current hash value.

2. The system of claim 1, further comprising instructions that cause the at least one processor to perform operations to:
   request, from an application server, the content item using the key; and
   transmit the content item to the content delivery network to render the requested webpage for presentation in a web browser of a user.

3. The system of claim 1, wherein the content delivery network directives are constructed using edge side includes.

4. The system of claim 1, further comprising instructions that cause the at least one processor to perform operations to:
   generate a time-to-live for the hash value for the content item; and
   transmit the time-to-live to the content delivery network with the hash value.

5. The system of claim 4, further comprising instructions that cause the at least one processor to perform operations to:
   request, from an application server, the content item using the key;
   determine that the content item is not included in an edge cache of the content delivery network;
   request a content update for the content delivery network from the application server; and
   transmit the content item for rendering the webpage for presentation in a web browser of a user.

6. The system of claim 1, wherein the content delivery network directive includes the content delivery network TTL value for the content item at the content delivery network and further comprising instructions that cause the at least one processor to perform operations to:
   determine that the content delivery network TTL value has elapsed;
   request an updated content item from an application server;
   provide the updated content item to the content delivery network; and
   store the updated content item in an edge cache of the content delivery network with an updated key.

7. The system of claim 1, further comprising instructions that cause the at least one processor to perform operations to:
   request, from an application server, the content item using the key;
   determine that there is not an edge cache key including the hash value in an edge cache of the content delivery network;
   request a content update for the content delivery network from the application server; and
   transmit the content item for rendering the webpage for presentation in a web browser of a user.

8. At least one non-transitory machine-readable medium including instructions for dynamic edge cache breaking that, when executed by at least one processor, cause the at least one processor to perform operations to:

construct one or more content delivery network directives for a requested webpage, wherein a content delivery network directive of the one or more content delivery network directives is used to retrieve a content item associated with at least one content item identifier from a content delivery network;

transmit the one or more content delivery network directives to the content delivery network, wherein the one or more content delivery network directives include a key with a hash variable reference;

receive a request, from the content delivery network upon expiration of a content delivery network time-to-live (TTL) value for the content item, for a hash value corresponding to the hash variable reference, wherein the request includes the key;

compute a current hash value for the content item; and transmit, to the content delivery network, the key including the current hash value.

9. The at least one non-transitory machine-readable medium of claim 8, further comprising instructions that cause the at least one processor to perform operations to:

request, from an application server, the content item using the key; and transmit the content item to the content delivery network to render the requested webpage for presentation in a web browser of a user.

10. The at least one non-transitory machine-readable medium of claim 8, wherein the content delivery network directives are constructed using edge side includes.

11. The at least one non-transitory machine-readable medium of claim 8, further comprising instructions that cause the at least one processor to perform operations to:

generate a time-to-live for the hash value for the content item; and transmit the time-to-live to the content delivery network with the hash value.

12. The at least one non-transitory machine-readable medium of claim 11, further comprising instructions that cause the at least one processor to perform operations to:

request, from an application server, the content item using the key;

determine that the content item is not included in an edge cache of the content delivery network;

request a content update for the content delivery network from the application server; and transmit the content item for rendering the webpage for presentation in a web browser of a user.

13. The at least one non-transitory machine-readable medium of claim 8, wherein the content delivery network directive includes the content delivery network TTL value for the content item at the content delivery network and further comprising instructions that cause the at least one processor to perform operations to:

determine that the content delivery network TTL value has elapsed;

request an updated content item from an application server;

provide the updated content item to the content delivery network; and store the updated content item in an edge cache of the content delivery network with an updated key.

14. The at least one non-transitory machine-readable medium of claim 8, further comprising instructions that cause the at least one processor to perform operations to:

request, from an application server, the content item using the key;

determine that there is not an edge cache key including the hash value in an edge cache of the content delivery network;

request a content update for the content delivery network from the application server; and transmit the content item for rendering the webpage for presentation in a web browser of a user.

15. A method for dynamic edge cache breaking, the method comprising:

constructing one or more content delivery network directives for a requested webpage, wherein a content delivery network directive of the one or more content delivery network directives is used to retrieve a content item associated with at least one content item identifier from a content delivery network;

transmitting the one or more content delivery network directives to the content delivery network, wherein the one or more content delivery network directives include a key with a hash variable reference;

receiving a request, from the content delivery network upon expiration of a content delivery network time-to-live (TTL) value for the content item, for a hash value corresponding to the hash variable reference, wherein the request includes the key;

computing a current hash value for the content item; and transmitting, to the content delivery network, the key including the current hash value.

16. The method of claim 15, further comprising:

requesting, from an application server, the content item using the key; and transmitting the content item to the content delivery network for rendering the requested webpage for presentation in a web browser of a user.

17. The method of claim 15, wherein the content delivery network directives are constructed using edge side includes.

18. The method of claim 15, further comprising:

generating a time-to-live for the hash value for the content item; and transmitting the time-to-live to the content delivery network with the hash value.

19. The method of claim 18, further comprising:

requesting, from an application server, the content item using the key;

determine that the content item is not included in an edge cache of the content delivery network;

requesting a content update for the content delivery network from the application server; and transmitting the content item for rendering the webpage for presentation in a web browser of a user.

20. The method of claim 15, wherein the content delivery network directive includes the content delivery network TTL value for the content item at the content delivery network and further comprising:

determining that the time-to-live value has elapsed;

requesting an updated content item from an application server;

providing the updated content item to the content delivery network; and storing the updated content item in an edge cache of the content delivery network with an updated key.

21. The method of claim 15, further comprising:

requesting, from an application server, the content item using the key;

determine that there is not an edge cache key including the hash value in an edge cache of the content delivery network;

requesting a content update for the content delivery network from the application server; and transmitting the content item for rendering the webpage for presentation in a web browser of a user.

* * * * *